United States Patent
Hurd et al.

(10) Patent No.: US 11,655,168 B2
(45) Date of Patent: May 23, 2023

(54) METHODS FOR WASTEWATER TREATMENT USING ALCOHOL ETHOXYLATE SURFACTANTS

(71) Applicant: Halliburton Energy Services, Inc., Houston, TX (US)

(72) Inventors: Jeff Allen Hurd, Calgary (CA); Chunli Li, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 271 days.

(21) Appl. No.: 16/881,857

(22) Filed: May 22, 2020

(65) Prior Publication Data

US 2021/0363035 A1 Nov. 25, 2021

(51) Int. Cl.
| | | |
|---|---|---|
| *C02F 1/68* | (2023.01) | |
| *C02F 5/10* | (2023.01) | |
| *C09K 8/524* | (2006.01) | |
| *C02F 1/54* | (2023.01) | |
| *C02F 101/34* | (2006.01) | |
| *C02F 103/10* | (2006.01) | |

(52) U.S. Cl.
CPC .............. *C02F 1/683* (2013.01); *C02F 5/10* (2013.01); *C09K 8/524* (2013.01); *C02F 1/547* (2013.01); *C02F 2101/34* (2013.01); *C02F 2103/10* (2013.01); *C02F 2303/22* (2013.01); *C02F 2305/04* (2013.01)

(58) Field of Classification Search
None
See application file for complete search history.

(56) References Cited

U.S. PATENT DOCUMENTS

| | | | | |
|---|---|---|---|---|
| 3,920,548 | A | * | 11/1975 | Fassell .................. C02F 11/08 |
| | | | | 210/761 |
| 7,993,529 | B2 | | 8/2011 | Honji et al. |
| 2007/0102359 | A1 | * | 5/2007 | Lombardi .............. B01D 61/04 |
| | | | | 210/764 |
| 2013/0240442 | A1 | | 9/2013 | Chidambaran et al. |
| 2013/0319663 | A1 | | 12/2013 | Buchanan et al. |
| 2014/0151296 | A1 | | 6/2014 | Moore et al. |
| 2014/0216946 | A1 | | 8/2014 | Milner et al. |

(Continued)

FOREIGN PATENT DOCUMENTS

| | | |
|---|---|---|
| CA | 2641236 | 4/2010 |
| EP | 2233440 A1 | 9/2010 |
| WO | 2010/044763 A1 | 4/2010 |

OTHER PUBLICATIONS

Pillai et al. (Energy & Fuels, 2017, 31, 8363-8373). (Year: 2017).*

(Continued)

*Primary Examiner* — Clare M Perrin
(74) *Attorney, Agent, or Firm* — Thomas Rooney; C. Tumey Law Group PLLC

(57) ABSTRACT

Methods for treating wastewater in conjunction with subterranean operations with a wastewater treatment additive. In some embodiments, the methods include providing wastewater recovered from at least a portion of a subterranean formation, wherein the wastewater includes water and an organic foulant material, and introducing a wastewater treatment additive that includes an alcohol ethoxylate surfactant into the recovered wastewater.

20 Claims, 1 Drawing Sheet

(56) References Cited

U.S. PATENT DOCUMENTS

2014/0263078 A1* 9/2014 Gill .......................... C02F 5/10
210/698
2014/0367095 A1 12/2014 Kolade

OTHER PUBLICATIONS

Ghouas et al. (Journal of Hazardous Materials, 2012, 205-206, 171-178). (Year: 2012).*
"Dissolved Organic Matter Characterization of SAGD Produced Water—Effects on Produced Water Treatment", presentation at WATERtech 2012, Banff, Alberta, Canada, 31 pages.
Li, Qilin, and Menachem Elimelech. "Organic fouling and chemical cleaning of nanofiltration membranes: measurements and mechanisms." Environmental science & technology 38.17 (2004): 4683-4693.
Candian Office Action for Application No. 3,110,500 dated Jan. 13, 2022.
Candian Office Action for Application No. 3,110,500 dated Jun. 3, 2022.
Ghouas et al., "Extraction of humic acid by coacervate: Investigation of direct and back processes", HAL Open Science, 2012, vol. 205-206, pp. 171-178, https://hal.archives-ouvertes.fr/hal-00878996, Oct. 31, 2013 (Oct. 31, 2013).
Haddou et al., "Chapter 5: Use of Cloud Point Extraction with Ethoxylated Surfactants for Organic Pollution Removal", The Role of Colloidal Systems in Environmental Protection, pp. 97-142, http://dx.doi.org/10.1016/B978-0-444-63283-8.00005-3, published in 2014, accessed Jul. 15, 2022.
Canadian Office Action for CA Patent Application No. 3110500 dated Jan. 10, 2023.
Rafeen et al., Crude Oil Fouling Petronas Refineries Experience, Heat Exchanger Fouling and Cleaning VII, vol. RP5 Article 4, pp. 8012, Engineering Conferences International, Tomar, Portugal, Jul. 2007.

* cited by examiner

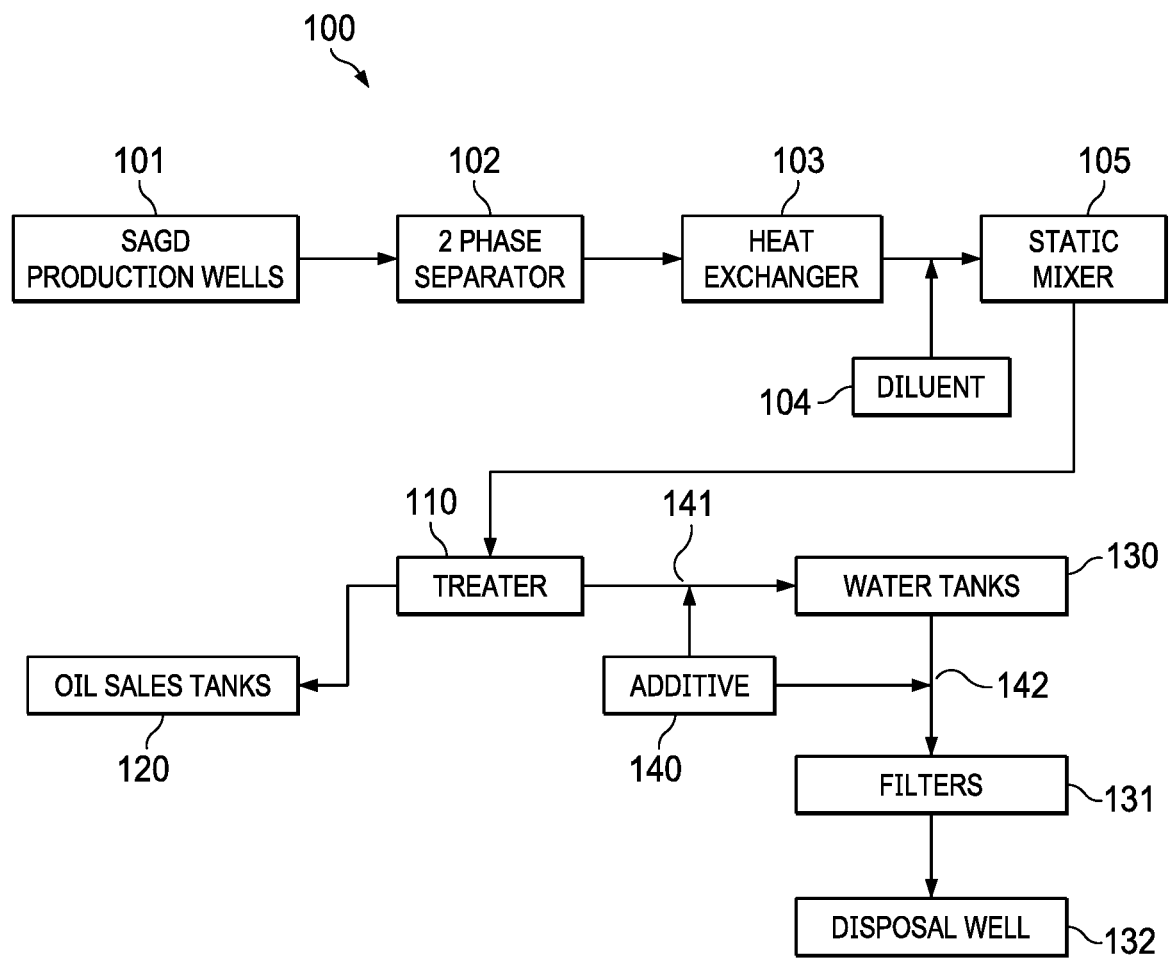

METHODS FOR WASTEWATER TREATMENT USING ALCOHOL ETHOXYLATE SURFACTANTS

BACKGROUND

The present disclosure relates to methods for use in subterranean operations, and more specifically, to improved methods for treating wastewater or effluent such as water that has been used in conjunction with subterranean operations.

Various types of subterranean wellbore operations (e.g., drilling, fracturing, etc.) sometimes generate large volumes of wastewater. As used herein, the term "wastewater" refers to any aqueous-based effluent produced in conjunction with subterranean operations, such as produced water, surface water, flowback water, and the like. The wastewater is typically collected into various ponds or sumps at a job site, and eventually it is transferred to a main holding area or sump. From here, the wastewater may be transferred to a water treatment plant for processing. The wastewater may contain a variety of components, including but not limited to an organic foulant material or a dilute slurry of finely dispersed particulates and other undissolved solids indigenous to the subterranean formation. The wastewater also may be produced by other processes and/or equipment at a job site, including but not limited to rainwater and deck drainage, as well as water used as a coolant, washdown or cleaning fluid, storm water, and/or other surface operations.

One subterranean wellbore operation that generates a significant volume of wastewater is Steam Assisted Gravity Drainage (SAGD). In SAGD drilling operations, a production well is typically drilled through a formation horizontally and then a steam injection well is drilled to a certain distance above the production well, e.g., five meters above the production well. Steam is subsequently injected into the steam injection well to raise the temperature of the surrounding hydrocarbon-containing formation. As the hydrocarbon-containing formation is heated, the viscosity of surrounding hydrocarbon may decrease and/or surrounding hydrocarbons may flow from the formation into the production well. This SAGD production system has been used to produce hydrocarbons too viscous to be produced as a liquid or gas in its natural state. For example, hydrocarbon-containing compounds have been produced from bituminous sands (or "tar sands") using a SAGD system.

Certain wastewater treatment additives may be introduced into wastewater produced from a formation in operations such as SAGD, among other reasons, to improve the wastewater treatment process for subterranean wellbore operations. The term "treatment" does not imply any particular action by the additive or any component thereof. Typical wastewater treatment additives are coagulants or precipitants that make small contaminants adhere to each other and, in turn, become larger contaminants that are more easily removed from the wastewater. The use of wastewater treatment additives facilitates the removal of contaminants in wastewater and allows for more efficient handling and disposal of such contaminated effluent.

BRIEF DESCRIPTION OF THE DRAWING

This drawing illustrates certain aspects of some of the embodiments of the present disclosure and should not be used to limit or define the claims.

FIG. 1 is a process flow diagram depicting a typical SAGD surface treatment facility in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DESCRIPTION OF CERTAIN EMBODIMENTS

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

The present disclosure relates to methods for treating wastewater that has been used in conjunction with subterranean operations. More particularly, the present disclosure relates to methods for treating wastewater with a wastewater treatment additive.

The present disclosure provides methods that include the use of an alcohol ethoxylate surfactant to treat wastewater produced from a subterranean formation in the course of a subterranean operation, such as a SAGD operation. In some embodiments, the methods may further include using a chelating agent in conjunction with an alcohol ethoxylate surfactant to treat such wastewater. In some embodiments, the methods may further include adding a wastewater treatment additive that includes an alcohol ethoxylate surfactant (and optionally, a chelating agent) to wastewater to reduce the agglomeration of contaminants. In some embodiments, the methods may further include adding the wastewater treatment additive to wastewater to reduce the agglomeration of organic foulant materials, like humic acid aggregates.

Among the many potential advantages of the present disclosure, the methods of the present disclosure may, among other things, reduce the agglomeration of contaminants in wastewater to levels required by various standards. In certain embodiments, the methods of the present disclosure may reduce the agglomeration of certain contaminants (e.g., organic foulants, humic acid aggregates) in wastewater to reduce fouling issues. For example, in some embodiments, the reduction of humic acid aggregates may mitigate the fouling issues found in wastewater treatment equipment, which may reduce operational downtime, decrease cleaning costs, and lower the operating pressure of the wastewater treatment plant. In some embodiments, the reduction of humic acid aggregates in wastewater may facilitate injection of fluids into SAGD disposal wells.

In certain embodiments, the methods of the present disclosure may use fewer chemical additives than other types of wastewater treatments, which may reduce the cost and/or the complexity of such treatments. In some embodiments, the methods of the present disclosure also may increase the amount of fresh water available for reuse in subsequent subterranean operations. In some embodiments, this may, among other benefits, reduce the amounts and/or the concentrations of contaminants in wastewater sufficiently to reuse that treated wastewater in subsequent operations at the same well site or job site where it was recovered. In some embodiments, this may reduce or eliminate the costs associated with transporting fresh water to the well site or job site for such operations.

In the methods of the present disclosure, wastewater may include any water or effluent collected at a job site that includes water and waste materials, such as organic fouling materials, emulsions, oils, and dissolved or undissolved particulate materials. The wastewater treated using the methods of the present disclosure may include any aqueous fluid from any source, including but not limited to water or another aqueous fluid recovered from a subterranean formation at a job site. The wastewater may include water or other aqueous fluids that had been used as treatment fluids in the formation, naturally occurring water or other aqueous fluids residing in the formation, or a combination thereof. In such embodiments, the wastewater may be recovered from the subterranean formation in conjunction with any type of subterranean operation or treatment, including but not limited to SAGD operations, enhanced oil recovery operations, solvent-based oil recovery operations, polymer flooding operations, cyclic steam injection operations, drilling operations, completion operations, cleanout operations, cementing operations, hydraulic fracturing treatments, acidizing treatments, and any combination thereof. In some embodiments, the wastewater treated using the methods of the present disclosure may contain some amount of oil and/or other components mixed with and/or dissolved in the water. A person of skill in the art, with the benefit of this disclosure, will recognize how to apply or implement the methods of the present disclosure as disclosed herein in a particular operation or treatment.

In the methods of the present disclosure, the wastewater is treated with a wastewater treatment additive. In certain embodiments, the wastewater treatment additive of the present disclosure may include an alcohol ethoxylate surfactant. In certain embodiments, the alcohol ethoxylate surfactant may reduce the agglomeration of certain contaminants in wastewater. For example, the alcohol ethoxylate surfactant may reduce the agglomeration of organic foulants, such as humic acid aggregates, in wastewater to a level that sufficiently mitigates the fouling issues commonly found in wastewater treatment equipment. Without intending to be limited to any particular theory or mechanism, it is believed that, in certain embodiments, the alcohol ethoxylate surfactant may disrupt the colloidal aggregation of organic foulant materials. This disruption of organic aggregates is believed to result from the electrostatic and steric interactions existing between the organic foulant materials and the alcohol ethoxylate surfactant, resulting in smaller-sized organic aggregates. The smaller-sized organic aggregates have greater suspension stability in wastewater than larger-sized organic aggregates, which reduces the amount of organic foulant materials precipitating out of solution and fouling the wastewater treatment equipment.

In some embodiments, the wastewater treatment additives of the present disclosure may include an alcohol ethoxylate surfactant. Examples of alcohol ethoxylate surfactants that may be suitable for certain embodiments of the present disclosure include, but are not limited to an isotridecanol ethoxylate, a primary alcohol ethoxylate, a secondary alcohol ethoxylate, a tertiary alcohol ethoxylate, a linear alcohol ethoxylate, a fatty alcohol ethoxylate, an alkylphenol ethoxylate, a tridecyl ethoxylate, a lauryl alcohol ethoxylate, a stearyl alcohol ethoxylate, a behenyl alcohol ethoxylate, an oleyl alcohol ethoxylate, and any combination thereof. In certain embodiments, the alcohol ethoxylate surfactant is ethoxylated isotridecanol. In some embodiments, the alcohol ethoxylate surfactant is ethoxylated isotridecanol with a degree of ethoxylation of 5 and a branched alkyl chain with 13 carbons. The selection of a suitable alcohol ethoxylate surfactant may depend on several factors that would be recognized by a person of skill in the art with the benefit of this disclosure, including but not limited to other chemical additives in the wastewater treatment additive of the present disclosure, the characteristics of the wastewater (e.g., contaminants, pH, salinity, etc.), and the like. In certain embodiments, the alcohol ethoxylate surfactant may be added to the wastewater treatment additive in an amount sufficient to reduce the agglomeration of certain contaminants in the wastewater and promote better operating conditions in the wastewater treatment plant. In certain embodiments, the alcohol ethoxylate surfactant may be added to the wastewater treatment additive in an amount from 20 parts per million ("ppm") up to about 5,000 ppm by volume of the additive. In some embodiments, the alcohol ethoxylate surfactant may be added to the wastewater treatment additive in an amount from about 100 ppm up to about 3,000 ppm by volume of the additive. In other embodiments, the alcohol ethoxylate surfactant may be added to the wastewater treatment additive in an amount from about 500 ppm up to about 2,000 ppm by volume of the additive.

The wastewater treatment additive of the present disclosure optionally may include any solvent known in the art. Aqueous solvents that may be suitable for use in the methods of the present disclosure may include water from any source. This may include fresh water, produced water, surface water, salt water (e.g., water containing one or more salts dissolved therein), brine (e.g., saturated salt water), seawater, and any combination thereof. The water used in an aqueous solvent may be from a source that does not contain compounds that adversely affect other components of the wastewater treatment additive. Examples of other solvents suitable for certain embodiments of the present disclosure include, but are not limited to an alcohol such as methanol or ethanol, a glycol such as polyethylene glycol, and any combination thereof. In certain embodiments, aqueous solvents may include an ionic species, such as those formed by salts dissolved in water. For example, seawater and/or produced water may include a variety of divalent cationic species dissolved therein. In certain embodiments, the density of the solvent may be adjusted. In certain embodiments, the pH of an aqueous solvent may be adjusted (e.g., by a buffer or other pH adjusting agent) to a specific level, which may depend on, among other factors, the alcohol ethoxylate surfactant, and/or other additional additives included in the wastewater treatment additive. One of ordinary skill in the art, with the benefit of this disclosure, will recognize when such density and/or pH adjustments are appropriate.

In some embodiments, the wastewater treatment additives of the present disclosure optionally may include a chelating agent. A chelating agent, also called a ligand, is either an ion or molecule that bonds via coordinate covalent bonds to a central metal to produce a coordination complex, called a chelate. As used herein, a "chelating agent" is a Lewis base, i.e., the chelating agent contains at least two donor atoms in the same molecule capable of donating electrons to the metal cation. Preferred donor atoms are heteroatoms and include nitrogen, oxygen, and sulfur. The central metal is a Lewis acid, i.e., the central metal can accept pairs of electrons from the chelating agent. A chelating agent that bonds through two coordinating atoms is called bidentate; one that bonds through three is called tridentate, and so on.

Examples of suitable chelating agents include, but are not limited to, ethylenediaminetetraacetic acid (EDTA), citric acid, sodium citrate, hydroxyethyl ethylenediamine triacetic acid (HEDTA), nitrilotriacetic acid (NTA), diethylene triamine pentaacetic acid (DTPA), glutamic acid diacetic (GLDA), propylene diamine tetraacetic acid (PDTA), ethylenediaminedisuccinic acid (EDDS), diethanolglycine (DEG), ethanoldiglycine (EDG), glucoheptonate, phosphates, amines, citrates, and salts thereof. Other suitable chelating agents may include chelating agents classified as polyphosphates, aminocarboxylic acids, aminopolycarboxylates, 1,3-diketones, hydroxycarboxylic acids, polyamines, aminoalcohols, aromatic heterocyclic bases, phenols, aminophenols, oximes, Schiff bases, tetrapyrroles, sulfur compounds, synthetic macrocyclic compounds, polymers, phosphonic acids, and mixtures and derivatives thereof. Other suitable chelating agents may include N-(phosphonomethyl) iminodiacetic acid, salts of N-(phosphonomethyl)iminodiacetic acid, salts of phosphonic acids, and any combination thereof.

In certain embodiments, the chelating agent may be added to the wastewater treatment additive in an amount sufficient to disperse organic foulant materials in wastewater. In some embodiments, the chelating agent may be added to the wastewater treatment additive in an amount sufficient so that the methods of the present disclosure may achieve a desired function and/or for a desired purpose for various types of wastewater. In certain embodiments, the chelating agent may be added to the wastewater treatment additive in an amount from about 1 ppm up to about 500 ppm by volume of the additive. In some embodiments, the chelating agent may be added to the wastewater treatment additive in an amount from about 1 ppm up to about 300 ppm by volume of the additive. In other embodiments, the chelating agent may be added to the wastewater treatment additive in an amount from about 10 ppm up to about 100 ppm by volume of the additive.

In certain embodiments, other chemical additives used in the methods of the present disclosure may include the use of any chemical additives known in the art for treating wastewater. Examples of other chemical additives that may be suitable include, but are not limited to, surfactants (e.g., foamers, defoamers, demulsifiers, and water clarifiers), pH adjusters (e.g., buffers, acids, and bases), biocides, coagulants, corrosion inhibitors, oxygen scavengers, sulfide scavengers, scale inhibitors, and any combination thereof. A person skilled in the art, with the benefit of this disclosure, will recognize the types of additional additives that may be included in the fluids of the present disclosure for a particular application. In some embodiments, the chemical additives may involve the addition of such additives to and/or reaction of such additives with components of the wastewater at one or more different parameters, all of which may be varied in different chemical treatments. Examples of such parameters include, but are not limited to, temperature, static pressure, pressure drop, shear rate, flow rate, additive concentration, additive dosing rate, residence time (e.g., time that the additive is allowed to react with components of the wastewater before other treatments are performed), and any combination thereof.

In certain embodiments, the components of the wastewater treatment additive including an alcohol ethoxylate surfactant, a chelating agent, and/or a solvent may be combined together before being added to wastewater. In such embodiments, the wastewater treatment additive including one or more of those components may be stored (e.g., in a tank or vessel) for a period of time before being added to wastewater. In certain embodiments, the wastewater treatment additive may be stored for up to 12 months before being added to wastewater. In some embodiments, the wastewater treatment additive may be stored for up to 6 months before being added to wastewater. In other embodiments, the wastewater treatment additive may be stored for up to 2 months before being added to wastewater.

In other embodiments, the components of the wastewater treatment additive including an alcohol ethoxylate surfactant, a chelating agent, and/or a solvent may be added separately to wastewater. In such embodiments, the alcohol ethoxylate surfactant, the chelating agent, and/or the solvent may collectively constitute a wastewater treatment additive even when separately added to wastewater. In certain embodiments, the wastewater treatment additive of the present disclosure (or one or more components thereof) may be directly metered into wastewater. In certain embodiments, the wastewater treatment additive (or one or more components thereof) may be added to wastewater by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the ongoing treatment. Such mixing can also be described as "real-time" mixing. In other embodiments, the wastewater treatment additive (or one or more components thereof) may be pulsed into wastewater. In certain embodiments, the wastewater treatment additive (or one or more components thereof) may be injected into a pipeline upstream of a tank or other suitable vessel containing wastewater. In other embodiments, the wastewater treatment additive (or one or more components thereof) may be directly added to the tank or other suitable vessel containing wastewater.

The wastewater treatment additive of the present disclosure and wastewater may be contacted using any suitable method and/or equipment known in the art at any time prior to their use. In certain embodiments, a wastewater treatment additive of the present disclosure may be injected into wastewater using surface piping, a treating vessel, or a tank. In most embodiments, a wastewater treatment additive of the present disclosure may be continuously injected into wastewater using surface piping (e.g., a flowline). The injection of a wastewater treatment additive may include any chemical injection known in the art. For example, in some embodiments, the injection of a wastewater treatment may be provided by a pump (e.g., peristaltic pump). In certain embodiments, a wastewater treatment additive of the present disclosure may be directly injected into pipelines, heat exchangers, any type of surface treating equipment, and any combination thereof.

Any known and measurable properties of the wastewater may be used in the methods of the present disclosure, including but not limited to pH, turbidity, emulsion strength, capacitance, impedance, thermal conductivity, electrical conductivity, salinity, oil content, solids content, water content, and any combination thereof. The sensors used to measure these properties also may include any known sensing or measurement equipment, including but not limited to thermistors, transducers, cameras, flow sensors, optical sensors, pH sensors, retort devices, and any combination thereof. In some embodiments, a guided wave radar system or other level sensor device may be used to detect separated layers of oil or aqueous fluids, and properties regarding the size and/or nature of those layers may be measured.

Some embodiments may include a treatment system for performing the methods of the present disclosure. In some embodiments, the treatment system may include any vessels (e.g., tanks), conduits (e.g., flowlines), or other devices suitable for conducting those treatments, and may be of any suitable shape and size for holding and/or treating wastewater. In some embodiments, the treatment systems may be located, and the treatment methods may be performed, on an offshore rig or ship that is engaged in offshore subterranean operations, such as a drilling rig or drill ship. In other embodiments, the treatment systems may be located, and the treatment methods may be performed, at a land-based job site. The various components of the treatment systems discussed herein, as well as any other components of those systems, may be housed together in a single unit, or may be provided as one or more separate modules or tanks that may be connected and/or otherwise used together to perform different portions of the treatment process.

In some embodiments, the conduits in these treatment systems may include a flowline. The flowline may be a pipe or hose through which fluids may flow from a wastewater treatment additive storage container into wastewater. Any suitable valves, pumps, or other devices may be used for controlling the flow of fluids through the flowline. In other embodiments, the vessels in these treatment systems may include a tank. The tank may include one or more inlets through which fluids may flow into the tank and one or more outlets through which fluids may be released. Any suitable valves, pumps, or other devices may be used for controlling the flow of fluids through the inlets and/or outlets of the tank. In some embodiments, the tank may be equipped with one or more agitation devices such as rotary stirring rods, paddles, blades, air nozzles, etc. that are configured to stir, mix, and/or agitate the contents of the tank.

In some embodiments, these vessels and/or conduits also may be equipped with arrays of sensors for detecting various types of phenomena (e.g., condition of certain equipment therein, flow of fluids, etc.) or properties of a fluid in the vessel and/or conduit. In some embodiments, the treatment systems may include one or more additive storage containers for holding and/or dispensing a wastewater treatment additive into the wastewater in the vessel or conduit of that system, or other actuatable components such as pumps, agitators, skimmers, filters, centrifuges, heaters, electrical current generators, and the like. For example, the wastewater treatment additive may be dispensed from one or more wastewater treatment additive storage containers configured to dispense the wastewater treatment additive into chemical treatment tanks. In some embodiments, the wastewater treatment additive storage containers and/or other actuatable components may be communicatively coupled to an information handling system and actuated or otherwise controlled by signals received from the information handling system without the need for human intervention or action directed to that action.

In some embodiments, the addition of a wastewater treatment additive to wastewater may be automated. Sensors may be used to assess one or more properties of the untreated and treated wastewater. Based on the assessment, one or more chemical treatments may be performed on the untreated wastewater or a sample thereof. In some embodiments, the chemical treatments performed on the wastewater sample may be selected, at least in part, based on the properties of the untreated wastewater. The sampling, measuring, and treatment of wastewater samples may be repeated for any suitable number of different chemical treatments. Based at least in part on the data regarding the properties of the treated sample(s), an information handling system such as a computer may select at least one chemical treatment to control one or more components of the treatment system to perform the selected chemical treatment on the untreated wastewater.

The treated water may be further treated, discharged, and/or reused in subsequent operations (e.g., further subterranean operations at the same job site from which the wastewater was recovered). For example, in some embodiments, the treated water may be reused for the continuous wellbore steam injection at a SAGD plant. In other embodiments, the treated water may be reused at a drilling operation where the treated water is pumped into a mud pit where drilling fluids are prepared and/or held prior to use. The treated water may be mixed with one or more additional components in the mud pit and then pumped out into a drill string or coiled tubing that is used to drill at least a portion of a well bore penetrating a subterranean formation (e.g., the same subterranean formation from which the wastewater was recovered). In certain embodiments, the treated water may be transferred from the tank described above to another treatment vessel such as a reverse osmosis unit, for among other reasons, to remove any remaining contaminants dissolved in the water, after which the remaining fresh water may be discharged, and/or reused in subsequent operations.

The present disclosure in some embodiments provides methods that include the use of a wastewater treatment additive to treat wastewater produced from a subterranean formation in the course of a subterranean operation. For example, and with reference to FIG. 1, a process flow 100 of a typical SAGD surface treatment facility according to certain embodiments of the present disclosure is shown. The use of arrows in FIG. 1 is not meant to imply any particular order in which the methods of the present disclosure must be performed. It should be noted that while FIG. 1 generally depicts the wastewater treatment process at a SAGD surface treatment facility, those skilled in the art will readily recognize that the principles described herein are equally applicable to wastewater treatment processes for other subterranean operations.

As illustrated, a production stream flows from SAGD production wells 101 to a two phase separator 102, which removes gases from the production stream. The production stream is then cooled in a heat exchanger 103 for an optimal separation temperature and a lower temperature requirement in downstream piping. A diluent 104 is subsequently added to the production stream and blended in a static mixer 105 to reduce viscosity and enhance fluid flow of the production stream. This diluent 104 may include, for example, a hydrocarbon solution containing condensates, natural gasoline, and naphtha. The production stream then enters a treater 110 that separates the production stream into two portions, wherein the first portion of the production stream includes oil and the second portion of the production stream includes wastewater. The first portion of the production stream including oil is sent to oil sales tanks 120 for eventual transportation using pipeline or truck. The second portion of the production stream including wastewater is sent to the water-side of the SAGD surface treatment facility, which includes water tanks 130, filters 131, and a disposal well 132. The wastewater is held in the water tanks 130 and then sent to the filters 131 to remove any oils and contaminants remaining in the wastewater before entering the disposal well 132. In another embodiment (not shown), the SAGD surface treatment facility may include one or more surface equipment between the treater 110 and the disposal well 132 for achieving a desired function and/or for a desired purpose.

One or more additives may be added to the wastewater after the treater 110 and on the water-side of the SAGD surface treatment facility for improving the overall operation of the facility. For example, the wastewater treatment additive 140 of the present disclosure may be added to the wastewater downstream of the treater 110 to reduce agglomeration of organic foulant materials, such as humic acid aggregates, and mitigate fouling on surface equipment. In some embodiments, the wastewater treatment additive 140 of the present disclosure may be added to the wastewater at a location 141 between the treater 110 and the water tanks 130. In other embodiments, the wastewater treatment additive 140 of the present disclosure may be added to the wastewater at a location 142 between the water tanks 130 and the filters 131. Most preferable embodiments will add the wastewater treatment additive 140 of the present disclosure upstream of the filters 131 in one or more locations, such as location 141 and/or location 142, in order to reduce the fouling and/or failure rates of the filters 131 and any other equipment that is contacted with the wastewater.

While not specifically illustrated herein, the disclosed methods may also directly or indirectly affect any transport or delivery equipment used to convey the wastewater treatment additive to the SAGD surface treatment facility such as, for example, any transport vessels, conduits, pipelines, trucks, tubulars, and/or pipes used to fluidically move the wastewater treatment additive from one location to another, any pumps, compressors, or motors used to drive the wastewater treatment additive into motion, any valves or related joints used to regulate the pressure or flow rate of the wastewater treatment additive, and any sensors (i.e., pressure and temperature), gauges, and/or combinations thereof, and the like.

An embodiment of the present disclosure is a method that includes: providing wastewater recovered from at least a portion of a subterranean formation, wherein the wastewater includes water and an organic foulant material; and introducing a wastewater treatment additive that includes an alcohol ethoxylate surfactant into the recovered wastewater.

In one or more embodiments described in the preceding paragraph, the wastewater is recovered from at least a portion of a subterranean formation in conjunction with at least one subterranean operation selected from a group consisting of: a SAGD operations, an enhanced oil recovery operation, a solvent-based oil recovery operation, a polymer flooding operation, a cyclic steam injection operation, a drilling operation, a completion operation, a cleanout operation, a cementing operation, a hydraulic fracturing treatment, an acidizing treatment, and any combination thereof. In one or more embodiments described in the preceding paragraph, the organic foulant material includes humic acid. In one or more embodiments described in the preceding paragraph, further including reducing the agglomeration of the organic foulant material. In one or more embodiments described in the preceding paragraph, the alcohol ethoxylate surfactant includes at least one alcohol ethoxylate surfactant selected from a group consisting of: an isotridecanol ethoxylate, a primary alcohol ethoxylate, a secondary alcohol ethoxylate, a tertiary alcohol ethoxylate, a linear alcohol ethoxylate, a fatty alcohol ethoxylate, an alkylphenol ethoxylate, a tridecyl ethoxylate, a lauryl alcohol ethoxylate, a stearyl alcohol ethoxylate, a behenyl alcohol ethoxylate, an oleyl alcohol ethoxylate, and any combination thereof. In one or more embodiments described in the preceding paragraph, the alcohol ethoxylate surfactant is present in the wastewater treatment additive in an amount from about 20 ppm to about 5,000 ppm by volume of the wastewater treatment additive. In one or more embodiments described in the preceding paragraph, the wastewater treatment additive further includes a chelating agent. In one or more embodiments described in the preceding paragraph, the chelating agent includes at least one chelating agent selected from a group consisting of: ethylenediaminetetraacetic acid (EDTA), citric acid, sodium citrate, hydroxyethyl ethylenediamine triacetic acid (HEDTA), nitrilotriacetic acid (NTA), diethylene triamine pentaacetic acid (DTPA), glutamic acid diacetic (GLDA), propylene diamine tetraacetic acid (PDTA), ethylenediaminedisuccinic acid (EDDS), diethanolglycine (DEG), ethanoldiglycine (EDG), a glucoheptonate, a phosphate, an amine, a citrate, a polyphosphate, an aminocarboxylic acid, an aminopolycarboxylate, a 1,3-diketone, a hydroxycarboxylic acid, a polyamine, an aminoalcohol, an aromatic heterocyclic base, a phenol, an aminophenol, an oxime, a Schiff base, a tetrapyrrole, a sulfur compound, a synthetic macrocyclic compound, a polymer, a phosphonic acid, N-(phosphonomethyl)iminodiacetic acid, a derivative of any of the foregoing, a salt of any of the foregoing, and any combination thereof. In one or more embodiments described in the preceding paragraph, the chelating agent is present in the wastewater treatment additive in an amount from about 1 ppm to about 500 ppm by volume of the wastewater treatment additive. In one or more embodiments described in the preceding paragraph, the wastewater treatment additive further includes at least one solvent selected from the group consisting of: water, an alcohol, a glycol, and any combination thereof. In one or more embodiments described in the preceding paragraph, further including disposing of or reusing at least a portion of the wastewater after introducing the wastewater treatment additive into the recovered wastewater.

An embodiment of the present disclosure is a method that includes: providing wastewater recovered from at least a portion of a subterranean formation before, during, or after a SAGD drilling operation, wherein the wastewater includes water and humic acid; and introducing a wastewater treatment additive into the recovered wastewater at a job site, the wastewater treatment additive including an ethoxylated isotridecanol, a chelating agent, and a solvent.

In one or more embodiments described in the preceding paragraph, further including reducing the formation of humic acid aggregates. In one or more embodiments described in the preceding paragraph, the wastewater treatment additive includes at least one additive selected from a group consisting of: a surfactant, a pH adjuster, a biocide, a coagulant, a corrosion inhibitor, an oxygen scavenger, a sulfide scavenger, a scale inhibitor, and any combination thereof. In one or more embodiments described in the preceding paragraph, the chelating agent includes at least one chelating agent selected from a group consisting of ethylenediaminetetraacetic acid (EDTA), citric acid, sodium citrate, hydroxyethyl ethylenediamine triacetic acid (HEDTA), nitrilotriacetic acid (NTA), diethylene triamine pentaacetic acid (DTPA), glutamic acid diacetic (GLDA), propylene diamine tetraacetic acid (PDTA), ethylenediaminedisuccinic acid (EDDS), diethanolglycine (DEG), ethanoldiglycine (EDG), a glucoheptonate, a phosphate, an amine, a citrate, a polyphosphate, an aminocarboxylic acid, an aminopolycarboxylate, a 1,3-diketone, a hydroxycarboxylic acid, a polyamine, an aminoalcohol, an aromatic heterocyclic base, a phenol, an aminophenol, an oxime, a Schiff base, a tetrapyrrole, a sulfur compound, a synthetic macrocyclic compound, a polymer, a phosphonic acid, N-(phosphonomethyl)iminodiacetic acid, a derivative of any of the foregoing, a salt of any of the foregoing, and any combination thereof.

An embodiment of the present disclosure is a method that includes: flowing recovered wastewater through at least a portion of a treatment system, wherein the recovered wastewater includes water and an organic foulant material; and injecting a wastewater treatment additive that includes an alcohol ethoxylate surfactant into the portion of the treatment system to contact the recovered wastewater with the wastewater treatment additive to form treated wastewater.

In one or more embodiments described in the preceding paragraph, at least a portion of the treatment system includes a surface pipe and a pump for injecting the wastewater treatment additive into the recovered wastewater. In one or more embodiments described in the preceding paragraph, at least a portion of the treatment system includes at least one tank. In one or more embodiments described in the preceding paragraph, at least a portion of the wastewater treatment additive is stored in a tank for up to 12 months before it is added to the recovered wastewater. In one or more embodiments described in the preceding paragraph, further including disposing of or reusing at least a portion of the recovered wastewater after introducing the wastewater treatment additive into the recovered wastewater in the treatment system.

To facilitate a better understanding of the present disclosure, the following example of certain aspects of particular embodiments are given. The following example is not the only example that could be given according to the present disclosure and is not intended to limit the scope of the disclosure or claims.

including an alcohol ethoxylate surfactant (ethoxylated isotridecanol with a degree of ethoxylation of 5 and a branched alkyl chain with 13 carbons). Some of the wastewater treatment additives of the present disclosure further included the addition of a chelating agent, such as citric acid or EDTA. Some of the other tested wastewater treatment additives included additives like sodium hydroxide.

In order to test filtration efficiency, a 1,000 milliliter ("mL") filter flask was first connected to a vacuum pump. A filtering apparatus was then attached to the top of the filter flask using a clamp. The filtering apparatus included a circle of glass microfiber filter paper with a 1 micrometer pore size and a 100 mesh stainless steel support screen located between a 300 mL glass funnel and a glass support base. The glass microfiber filter medium was selected based upon its resemblance with the sandstone formation geology of SAGD disposal wells. Next, the SAGD Produced Water Sample #1 and the wastewater treatment additives were filtered through the apparatus in 500 mL increments until the filter paper was either plugged or 5,000 mL of the liquid samples were filtered. In the former case, the total filtrate volume of a liquid sample was recorded. In the latter case, the total time required to filter 5,000 mL of a liquid sample was recorded.

Based upon the above experimental methods, Table 1 shows the elapsed times of pouring the 500 mL liquid samples into the filtration apparatus and the corresponding filtration efficiency. For simplicity, only the first four elapsed times of the 500 mL liquid sample increments were tabulated below. The filtration efficiency was empirically determined from the ratio of the total filtrate volume of the filtered wastewater treatment additive and the total filtrate volume of the filtered SAGD produced water sample.

TABLE 1

| Liquid Samples | Elapsed Time (min:sec) | | | | Total Time (min:sec) Required to Filter 5000 mL of Treated Produced Water up to 5 Minutes | Total Filtrate Volume (mL) | Filtration Efficiency |
| --- | --- | --- | --- | --- | --- | --- | --- |
| | $1^{st}$ 500 mL | $2^{nd}$ 500 mL | $3^{rd}$ 500 mL | $4^{th}$ 500 mL | | | |
| SAGD Produced Water Sample #1 | 00:43 | — | — | — | 05:00 | 550 | 1 |
| Ethoxylated Isotridecanol | 00:14 | 00:31 | 00:48 | 01:05 | 03:01 | 5000 | >9 |
| Ethoxylated Isotridecanol + Citric Acid | 00:15 | 00:32 | 00:48 | 01:04 | 02:32 | 5000 | >9 |
| Ethoxylated Isotridecanol + EDTA | 00:13 | 00:28 | 00:44 | 01:00 | 02:38 | 5000 | >9 |
| NaOH (25% solution) | 00:50 | — | — | — | 05:00 | 590 | ~1 |
| NaOH (25% solution) + EDTA | 00:19 | 02:18 | — | — | 05:00 | 1090 | ~2 |

EXAMPLE

In this example, filtration efficiency was tested on several wastewater treatment additives. Each of the wastewater treatment additives was tested on SAGD wastewater, commonly known as SAGD produced water. As an experimental control, a sample of the SAGD produced water was left untreated (SAGD Produced Water Sample #1) in order to demonstrate the filtration efficiency between the SAGD produced water and the wastewater treatment additives. Some of the tested wastewater treatment additives were wastewater treatment additives of the present disclosure Upon inspection the SAGD Produced Water Sample #1 plugged the filter paper more quickly than the other samples. However, the addition of an alcohol ethoxylate surfactant (ethoxylated isotridecanol) to the SAGD produced water increased the filtration efficiency. Moreover, the addition of a chelating agent to such samples further increased the filtration efficiency. Furthermore, the addition of an alcohol ethoxylate surfactant with and without a chelating agent to the SAGD produced water had a greater filtration efficiency compared to the addition of sodium hydroxide with and without a chelating agent to the SAGD produced water.

Additionally, the experimental methods were repeated for another SAGD produced water sample (SAGD Produced Water Sample #2). The same methodology was applied to test the filtration efficiency of the following wastewater treatment additives. However, instead of comparing the wastewater treatment additives of the present disclosure to additives like sodium hydroxide, the sodium hydroxide additives were replaced with the following surfactants: sulfosuccinate diester, Tergitol 15-S-9, and Tergitol NP-8. The Tergitol surfactants are linear, non-ionic surfactants commercially available from The Dow Chemical Company. Table 2 shows the elapsed times of pouring the 500 mL liquid samples into the filtration apparatus and the corresponding filtration efficiency for these surfactants and the wastewater treatment additives of the present disclosure.

TABLE 2

| Liquid Samples | Elapsed Time (min:sec) | | | | Total Time (min:sec) Required to Filter 5000 mL of Treated Produced Water up to 5 Minutes | Total Filtrate Volume (mL) | Filtration Efficiency |
|---|---|---|---|---|---|---|---|
| | $1^{st}$ 500 mL | $2^{nd}$ 500 mL | $3^{rd}$ 500 mL | $4^{th}$ 500 mL | | | |
| SAGD Produced Water Sample #2 | 01:10 | — | — | — | 05:00 | 610 | 1 |
| Ethoxylated Isotridecanol | 00:13 | 00:28 | 00:43 | 00:58 | 02:25 | 5000 | >8 |
| Ethoxylated Isotridecanol + Sodium Citrate | 00:13 | 00:28 | 00:43 | 00:59 | 02:30 | 5000 | >8 |
| Sulfosuccinate Diester | 00:23 | 02:43 | — | — | 05:00 | 1075 | ~1.8 |
| Tergitol 15-S-9 | 00:20 | 00:45 | 01:30 | 03:17 | 05:00 | 2243 | ~3.7 |
| Tergitol NP-8 | 00:29 | 01:15 | 02:03 | 03:02 | 05:00 | 2755 | ~4.5 |

Similar to the results shown in Table 1, the results in Table 2 illustrated that an untreated SAGD produced water sample plugged the filter paper more quickly than the other samples. However, the addition of an alcohol ethoxylate surfactant (ethoxylated isotridecanol) with and without a chelating agent (sodium citrate) to the SAGD produced water increased the filtration efficiency. Furthermore, the addition of an alcohol ethoxylate surfactant with and without a chelating agent to the SAGD produced water had a greater filtration efficiency compared to the addition of common surfactants (sulfosuccinate diester, Tergitol 15-S-9, and Tergitol NP-9) to the SAGD produced water.

Thus, this Example demonstrates that the wastewater treatment additive of the present disclosure including certain combinations of an alcohol ethoxylate surfactant and a chelating agent may increase the filtration efficiency of SAGD wastewater. This result suggests that the wastewater treatment additive of the present disclosure may increase the filtration performance of SAGD wastewater by reducing the agglomeration of organic foulant materials, like humic acid aggregates, that are known to exist in SAGD wastewater.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
introducing a wastewater treatment additive that comprises an alcohol ethoxylate surfactant and a non-polymeric chelating agent into wastewater recovered from at least a portion of a subterranean formation, wherein the wastewater comprises water and an organic foulant material, wherein the organic foulant material is humic acid, wherein the alcohol ethoxylate surfactant is present in an amount from about 500 parts per million to about 2,000 parts per million by volume of the wastewater treatment additive, wherein the alcohol ethoxylate is isotridecanol ethoxylate, wherein the non-polymeric chelating agent is present in an amount from about 1 part per million to about 500 parts per million by volume of the wastewater treatment additive, and wherein the wastewater treatment additive reduces the formation of humic acid aggregates.

2. The method of claim 1, wherein the wastewater is recovered from at least a portion of a subterranean formation in conjunction with at least one subterranean operation selected from a group consisting of: a SAGD operation, an enhanced oil recovery operation, a solvent-based oil recovery operation, a polymer flooding operation, a cyclic steam injection operation, a drilling operation, a completion operation, a cleanout operation, a cementing operation, a hydraulic fracturing treatment, an acidizing treatment, and any combination thereof.

3. The method of claim 1, wherein the wastewater treatment additive further comprises at least one additional alcohol ethoxylate surfactant selected from the group consisting of: an isotridecanol ethoxylate, a primary alcohol ethoxylate, a secondary alcohol ethoxylate, a tertiary alcohol ethoxylate, a linear alcohol ethoxylate, a fatty alcohol ethoxylate, an alkylphenol ethoxylate, a tridecyl ethoxylate, a lauryl alcohol ethoxylate, a stearyl alcohol ethoxylate, a behenyl alcohol ethoxylate, an oleyl alcohol ethoxylate, and any combination thereof.

4. The method of claim 1, wherein the non-polymeric chelating agent comprises at least one chelating agent selected from the group consisting of: ethylenediaminetetraacetic acid (EDTA), citric acid, sodium citrate, hydroxyethyl ethylenediamine triacetic acid (HEDTA), nitrilotriacetic acid (NTA), diethylene triamine pentaacetic acid (DTPA), glutamic acid diacetic (GLDA), propylene diamine tetraacetic acid (PDTA), ethylenediaminedisuccinic acid (EDDS), diethanolglycine (DEG), ethanoldiglycine (EDG), a glucoheptonate, a phosphate, an amine, a citrate, an aminocarboxylic acid, a 1,3-diketone, a hydroxycarboxylic acid, an aminoalcohol, an aromatic heterocyclic base, a phenol, an aminophenol, an oxime, a Schiff base, a tetrapyrrole, a sulfur compound, a synthetic macrocyclic compound, a phosphonic acid, N-(phosphonomethyl)iminodiacetic acid, a derivative of any of the foregoing, a salt of any of the foregoing, and any combination thereof.

5. The method of claim 1, wherein the wastewater treatment additive further comprises at least one solvent selected from the group consisting of: water, an alcohol, a glycol, and any combination thereof.

6. The method of claim 1, further comprising disposing of or reusing at least a portion of the wastewater after introducing the wastewater treatment additive into the recovered wastewater.

7. The method of claim 1, wherein the non-polymeric chelating agent comprises ethylenediaminetetraacetic acid (EDTA).

8. The method of claim 7, wherein the wastewater treatment additive further comprises at least one additional non-polymeric chelating agent selected from the group consisting of citric acid, sodium citrate, hydroxyethyl ethylenediamine triacetic acid (HEDTA), nitrilotriacetic acid (NTA), diethylene triamine pentaacetic acid (DTPA), glutamic acid diacetic (GLDA), propylene diamine tetraacetic acid (PDTA), ethylenediaminedisuccinic acid (EDDS), diethanolglycine (DEG), ethanoldiglycine (EDG), a glucoheptonate, a phosphate, an amine, a citrate, an aminocarboxylic acid, a 1,3-diketone, a hydroxycarboxylic acid, an aminoalcohol, an aromatic heterocyclic base, a phenol, an aminophenol, an oxime, a Schiff base, a tetrapyrrole, a sulfur compound, a synthetic macrocyclic compound, a phosphonic acid, N-(phosphonomethyl)iminodiacetic acid, a derivative of any of the foregoing, a salt of any of the foregoing, and any combination thereof.

9. A method comprising:
separating a production stream into a first portion comprising oil and a second portion comprising wastewater; wherein the wastewater comprises water and humic acid; and
introducing a wastewater treatment additive into the second portion, the wastewater treatment additive comprising an ethoxylated isotridecanol, a non-polymeric chelating agent, and a solvent, wherein the ethoxylated isotridecanol is present in the wastewater treatment additive in an amount of about 500 parts per million to about 2,000 parts per million by volume of the wastewater treatment additive, wherein the ethoxylated isotridecanol reduces the formation of humic acid aggregates in the second portion; and wherein the non-polymeric chelating agent is present in an amount from about 1 part per million to about 500 parts per million by volume of the wastewater treatment additive;
filtering the second portion to remove oils and/or contaminants remaining in the second portion; and
introducing the second portion into a disposal well.

10. The method of claim 9, wherein the wastewater treatment additive comprises at least one additive selected from the group consisting of: a surfactant, a pH adjuster, a biocide, a coagulant, a corrosion inhibitor, an oxygen scavenger, a sulfide scavenger, a scale inhibitor, and any combination thereof.

11. The method of claim 9, wherein the non-polymeric chelating agent comprises at least one chelating agent selected from the group consisting of ethylenediaminetetraacetic acid (EDTA), citric acid, sodium citrate, hydroxyethyl ethylenediamine triacetic acid (HEDTA), nitrilotriacetic acid (NTA), di ethylene tri amine pentaacetic acid (DTPA), glutamic acid diacetic (GLDA), propylene diamine tetraacetic acid (PDTA), ethylenediaminedisuccinic acid (EDDS), diethanolglycine (DEG), ethanoldiglycine (EDG), a glucoheptonate, a phosphate, an amine, a citrate, an aminocarboxylic acid, a 1,3-diketone, a hydroxycarboxylic acid, an aminoalcohol, an aromatic heterocyclic base, a phenol, an aminophenol, an oxime, a Schiff base, a tetrapyrrole, a sulfur compound, a synthetic macrocyclic compound, a phosphonic acid, N-(phosphonomethyl)iminodiacetic acid, a derivative of any of the foregoing, a salt of any of the foregoing, and any combination thereof.

12. A method comprising:
flowing recovered wastewater through at least a portion of a treatment system, wherein the recovered wastewater comprises water and an organic foulant material comprising humic acid; and
injecting a wastewater treatment additive that comprises an alcohol ethoxylate surfactant and a non-polymeric chelating agent into the portion of the treatment system to contact the recovered wastewater with the wastewater treatment additive to reduce the formation of humic acid aggregates and form treated wastewater, wherein ethoxylated isotridecanol is present in the wastewater treatment additive in an amount of about 500 parts per million to about 2,000 parts per million by volume of the wastewater treatment additive, and wherein the non-polymeric chelating agent is present in an amount from about 1 part per million to about 500 parts per million by volume of the wastewater treatment additive.

13. The method of claim 12, wherein at least a portion of the treatment system comprises a surface pipe and a pump for injecting the wastewater treatment additive into the recovered wastewater.

14. The method of claim 12, wherein at least a portion of the treatment system comprises at least one tank.

15. The method of claim 12, wherein at least a portion of the wastewater treatment additive is stored in a tank for up to 12 months before it is added to the recovered wastewater.

16. The method of claim 12, further comprising disposing of or reusing at least a portion of the recovered wastewater after introducing the wastewater treatment additive into the recovered wastewater in the treatment system.

17. The method of claim 12 further comprising performing one or more chemical treatments on the recovered wastewater, wherein the one or more chemical treatments comprise injecting into the recovered wastewater at least one additional wastewater treatment additive selected from the group consisting of surfactants, pH adjusters, biocides, coagulants, corrosion inhibitors, oxygen scavengers, sulfide scavengers, scale inhibitors, and any combination thereof.

18. The method of claim 12 further comprising at least one assessment of a property of wastewater selected from the group consisting of assessing one or more properties of the recovered wastewater with a sensor, assessing one or more properties of the treated wastewater with a sensor, and combinations thereof.

19. The method of claim 12, wherein the wastewater treatment additive is injected upstream of at least one processing unit selected from the group consisting of a filter and a tank.

20. The method of claim 12 further comprising flowing the treated wastewater through at least one transportation means selected from the group consisting of transport vessels, conduits, pipelines, trucks, pipes, pumps, compressors, motors, valves, and combinations thereof.

\* \* \* \* \*